(12) United States Patent
Hall

(10) Patent No.: US 7,954,139 B1
(45) Date of Patent: May 31, 2011

(54) ARRANGEMENTS FOR EFFICIENT AUTHENTICATION OF SERVICE REQUEST MESSAGES

(75) Inventor: Robert J. Hall, Berkeley Heights, NJ (US)

(73) Assignee: AT&T Intellectual Property II, LP, Atlanta, GA (US)

( * ) Notice: Subject to any disclaimer, the term of this patent is extended or adjusted under 35 U.S.C. 154(b) by 1047 days.

(21) Appl. No.: 11/290,861

(22) Filed: Nov. 30, 2005

(51) Int. Cl.
*H04L 9/00* (2006.01)
(52) U.S. Cl. ......................................................... 726/5
(58) Field of Classification Search .................. 713/155, 713/168, 170, 158; 726/5, 6, 7, 18, 19
See application file for complete search history.

(56) References Cited

U.S. PATENT DOCUMENTS

| | | | |
|---|---|---|---|
| 5,651,069 A | 7/1997 | Rogaway | |
| 5,930,479 A | 7/1999 | Hall | |
| 7,412,598 B1 * | 8/2008 | Gleichauf | 713/155 |
| 7,500,104 B2 * | 3/2009 | Goland | 713/175 |
| 7,536,544 B2 * | 5/2009 | Xiao | 713/158 |
| 2002/0152384 A1 | 10/2002 | Shelest et al. | |
| 2002/0194308 A1 | 12/2002 | Hall | |
| 2004/0010683 A1 | 1/2004 | Huitema | |
| 2004/0054928 A1 | 3/2004 | Hall | |
| 2004/0064732 A1 | 4/2004 | Hall | |
| 2004/0193875 A1 | 9/2004 | Aura | |
| 2004/0233040 A1 * | 11/2004 | Lane et al. | 340/5.86 |

* cited by examiner

*Primary Examiner* — Beemnet W Dada
(74) *Attorney, Agent, or Firm* — Hanley, Flight & Zimmerman, LLC

(57) ABSTRACT

A server processes a service request message (SRM) including a credential string and information (I) specifying a requested service. The server determines (305) whether or not the received credential string is valid, by comparing the received credential string and a key in an authorization database (FIG. 1 Auth DB; Table 1) that is associated with the server. Records of the authorization database include the key, and zero or more parameters constituting respective restrictions on performing the requested service for the service requester associated with the credential string that matches the key. The server tests (305, and FIG. 4A) any parameter values against the restrictions to judge whether or not the restrictions are met, and causes (322) performance of the requested service if the credential string is determined to be valid and the restrictions are judged to be met. An alternative method involves receiving (352) a credential string, and determining (354) whether or not the received credential string is valid, by comparing the received credential string and an authorization database string from an authorization database (FIG. 1 Auth DB; Table 1) that is associated with the server and that includes a set of records including respective authorization database strings. If the received credential string is determined to be valid, the method further involves receiving (372) the SRM that includes information (I) specifying a requested service, and causing (374) performance of the requested service.

27 Claims, 8 Drawing Sheets

ARRANGEMENTS FOR EFFICIENT AUTHENTICATION OF SERVICE REQUEST MESSAGES

BACKGROUND

1. Field of the Invention

This invention relates to arrangements for authenticating service request messages (SRMs). More specifically, the invention relates to arrangements for using minimal computational overhead in authenticating SRMs in secure networks.

2. Background Art

A multi-service application-aware network, such as a web service network, a service oriented architecture, or a Distributed XML Transformation System (DXTS), must support highly flexible authentication and delegation of access privileges, as data must typically flow through many processing nodes owned by diverse parties. Moreover, each node may provide multiple processing services, possibly owned by multiple non-cooperating stakeholders.

Further, the full execution of a task may involve multi-stage processing. For example, multi-stage processing may involve submitting a first request to a first processing node and then having the results of that request forwarded to a second processing node for further processing. At each stage of this "pipeline", requests must be authenticated so that resources cannot be stolen or purposely wasted (as in a denial of service (DoS) attack).

Traditional Internet credentials involve a digital signature based on public key cryptography approaches that are computation intensive. Because every request requires a complex calculation just in order to reject it, computation-intensive approaches permit denial of service (DoS) attacks to be successful. Thus, there is a need for an authentication approach that is much less computation-intensive, to minimize the effectiveness of denial of services attacks.

Another conventional authentication method involves a user authentication scheme native to the host on which the application runs. One example involves username/password pairs. The disadvantage of this conventional scheme is that all clients who wish to access a service using a single username/password combination must all know the same password, making it impossible to reliably distinguish which client made which request.

Moreover, this conventional approach gives access to all applications installed on the machine and available to the username. This approach thus does not allow control over which applications are accessible to which clients, and does not permit tracking usage of specific applications by specific clients. Further, logging credentials are not typically limited as to the number of application invocations they allow, nor the times at which the client is allowed to invoke particular applications.

Accordingly, there is a need for a finer grained authentication system that provides reliable client-to-application control and tracking.

Moreover, it desirable that an authentication system be flexible in its ability to allocate, delegate or revoke credentials.

Further, there is a need for flexible scheme that allows early rejection of unauthorized requests with small computational effort, and yet also allows flexible allocation, delegation, and revocation of credentials.

SUMMARY

In some embodiments, a server processes a service request message (SRM) including a credential string and information specifying a requested service. The server determines whether or not the received credential string is valid, by comparing the received credential string and a key in an authorization database that is associated with the server. Records of the authorization database include the key, and zero or more parameters constituting respective restrictions on performing the requested service for the service requester associated with the credential string that matches the key. The server tests any parameter values against the restrictions to judge whether or not the restrictions are met, and causes performance of the requested service if the credential string is determined to be valid and the restrictions are judged to be met.

In other embodiments, a server processes an SRM originating from a service requester, by receiving a credential string and determining whether or not the received credential string is valid, by comparing the received credential string and an authorization database string from an authorization database that is associated with the server and that includes a set of records including respective authorization database strings. If the received credential string is determined to be valid, the server receives the SRM that includes information specifying a requested service, and causes performance of the requested service.

Still other embodiments provide a server, comprising an authorization database that includes a set of records. The records include an authorization database string configured to be compared to a received credential string associated with a requested service, and a set of zero or more parameters constituting respective restrictions on performing the requested service for a service requester associated with the credential string that matches the authorization database string. The server also has means for determining whether or not the received credential string is valid, by comparing the received credential string to the authorization database string, means for testing any parameter values against the restrictions, to judge whether or not the restrictions are met, and means for causing performance of the requested service if the credential string is determined to be valid and the restrictions are judged to be met.

BRIEF DESCRIPTION OF THE DRAWINGS

A more complete appreciation of the described embodiments is better understood by reference to the following Detailed Description considered in connection with the accompanying drawings, in which like reference numerals refer to identical or corresponding parts throughout, and in which.

DETAILED DESCRIPTION

Figure 1:
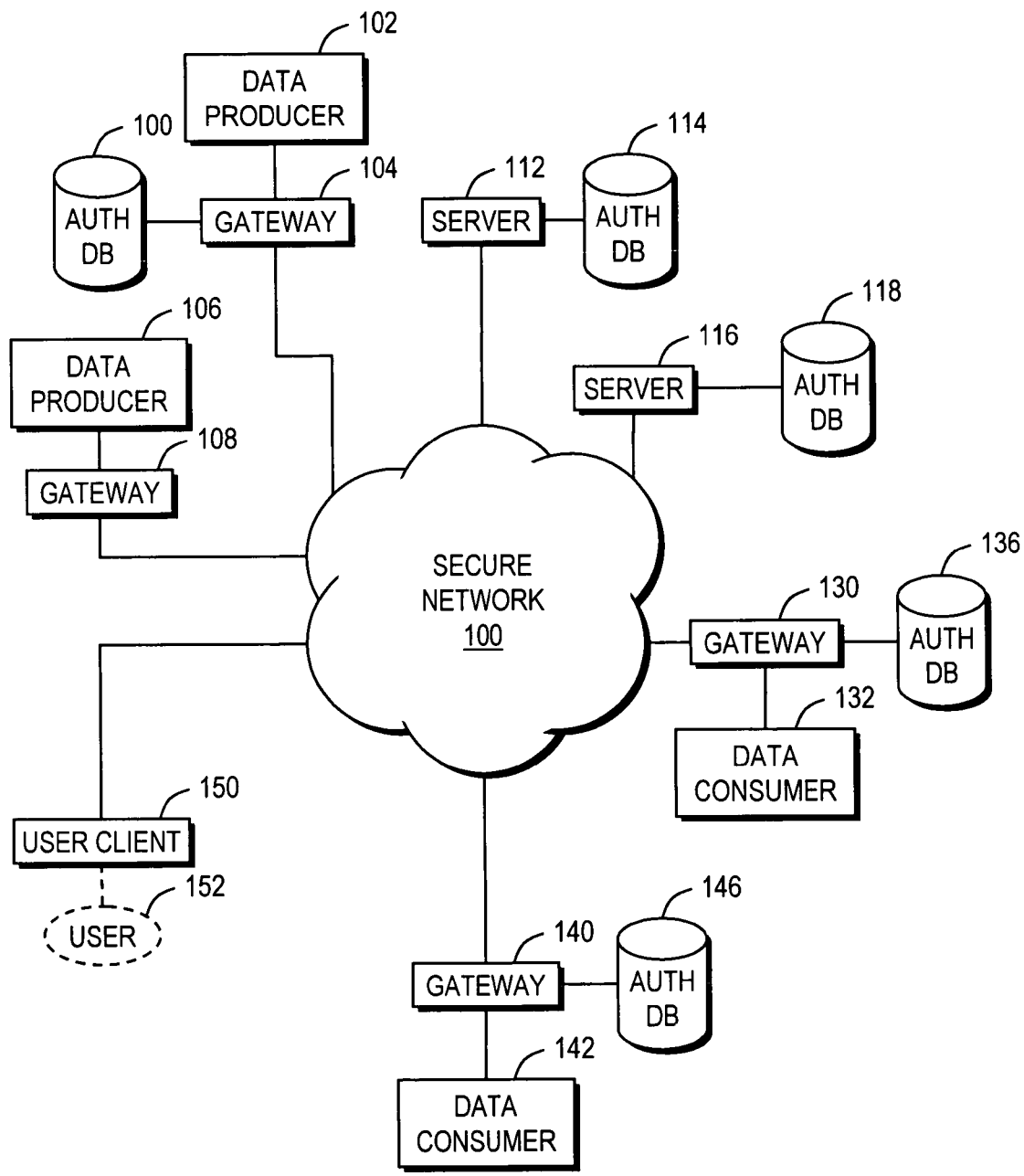
FIG. 1 is a schematic diagram of one embodiment of a secure network 100 connecting various elements.

In describing embodiments illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose. Various terms that are used in this specification are to be given their broadest reasonable interpretation when used to interpret the claims.

Moreover, features and procedures whose implementations are well known to those skilled in the art are omitted for brevity. For example, network communications equipment and techniques that are available and known to those skilled in the art need not be included. Likewise, in computer-implemented methods, initiation and termination of loops, and the corresponding incrementing and testing of loop variables, may be only briefly mentioned or illustrated, their details being easily surmised by skilled artisans. Thus, the steps involved in methods described herein may be readily implemented by those skilled in the art without undue experimentation.

Further, various aspects, features and embodiments may be described as a process that can be depicted as a flowchart, a flow diagram, a structure diagram, or a block diagram. Although a flowchart may describe the operations as a sequential process, many of the operations can be performed in parallel, concurrently, or in a different order than that described. Operations not needed or desired for a particular implementation may be omitted. A process or steps thereof may correspond to a method, a function, a procedure, a subroutine, a subprogram, and so forth, or any combination thereof.

In order to successfully field a commercial application-aware network service such as a web service network, service oriented architecture, or Distributed XML Transformation System (DXTS), a system of secure authentication is required. The present invention provides secure authorization for application-aware networks in a way that lowers costs, stops fraud, improves efficiency, and avoids denial of service (DoS) attacks.

In one embodiment, a stakeholder within DXTSs (or other secure multi-stakeholder networks) who controls an application (e.g., an XML transform running at a node within the DXTS) issues a substantially unguessable character string S to each client entity it wishes to authorize. The transform is then accessed using this string as identification. One application of the present service request message processing scheme is in DXTSs, which are described in U.S. application Ser. No. 11/978,549 filed Nov. 1, 2004 (entitled A System and Method for Distributed Content Transformation) and 60/517, 146, filed Nov. 4, 2003, which are incorporated herein by reference.

To submit an input to an application (e.g. XML data to an XML transform) running on a host called xformhost, the input is presented together with a credential S. Here, S is an "open" (or valid) credential at xformhost for the particular application. Typically, but not necessarily, xformhost itself determines whether or not S is a valid credential at xformhost and for the particular application. If the credential is valid, then service is granted by running the application for which S is valid on the presented input. Advantageously, any billing or tracking can be associated with the subscriber to whom S was granted.

Compared to conventional digital signatures that are used in non-secure networks where messages can be intercepted and/or altered in transit, the present arrangements are especially useful in secure networks. For example, the present service request message processing can be used over Virtual Private Networks (VPNs) using the IPsec suite of protocols, which encapsulates the traffic as it is transported across an insecure substrate network like the Internet.

Revoking a credential generally involves changing the status of a previously valid credential to non-valid. This revocation may involve removing S from a table of valid credentials at a service node, altering a value in a table entry corresponding to S, or even implicitly through the passage of time beyond a designated limiting value. Validation of a service request message (SRM) typically involves a table lookup, which, computationally, is significantly cheaper than conventional digital signature verification. Because each request is rejected quickly, the embodiment's approach is resistant to denial of service attacks in which an attacker floods a service node with large numbers of junk requests. Yet, by choosing long enough strings, the chances of either collisions among valid strings or brute force guessing attacks can be minimized.

Authorization can be delegated through many levels of transform (e.g. for multi-stage XML transformations in a DXTS) by simply passing along the credential granted to a client as part of an XML structured data packet. It can ride there until it reaches the transform that needs it to access a service deep in the network. Alternatively, a service requester can create a delegated credential having limited capabilities (say, for use only once) for a node, and pass that along with the request. The first transform node, in addition to performing its own transformation, extracts the delegated credential and uses it to send a new, constructed request including the delegated credential to a second node.

Easy revocability implies that the credential can be delegated for a limited period and then revoked, so that any intermediaries need not be trusted beyond one transaction. Furthermore, credentials can be allocated with limited lifetimes, such as lasting only for one (or a given number) of service requests, or for a pre-determined length of time.

Additionally, different classes of service can be granted by the credential mechanism.

Furthermore, by allocating a credential per client for each application within the network, reliable client-to-application-use tracking is enabled.

FIG. 1 is a schematic diagram of one embodiment of a secure network 100 connecting various elements, such as:
  data producers 102, 106, . . . ,
  data consumers 132, 142, . . . ,
  users 152 . . . ,
  servers (processing nodes) 112, 116, . . . ,
  other elements not specifically shown.

Secure network 100 may be, for example, a virtual private network (VPN) or a secure intranet within a firewall. Data producers 102, 106 are connected to network 100 through respective gateways 104, 108. Likewise, data consumers 132, 142 are connected to network 100 by respective gateways 130, 140. Each data consumer gateway may have a respective authorization database (Auth DB) 136, 146. The gateway 104 of data producer 102 has an Auth DB 100; however, typically the information in an Auth DB may be incorporated within a data producer 106 itself so that its gateway 108 does not require an Auth DB. User 152 may be connected to the network by a suitable user client 150. Servers (processing nodes) 112, 116 are connected to respective authorization databases (AuthDBs) 114, 118.

The present disclosed arrangements' security depends on the security of the underlying network and of the service nodes. Attackers should not be allowed to snoop network traffic between sender and service node. Thus, service network's security may be implemented, for example, through an IPsec-based Virtual Private Network (VPN) overlay on top of a traditional IP network.

In one embodiment, the authorization databases (Auth DBs) are generally unique to each entity (server, gateway, etc.) with which it is affiliated. In this embodiment, the database entries constitute records that associate a credential (such as an practically unguessable string) that is unique on a per requester and a per service (application) basis. That is, a credential string uniquely identifies a service requester, and parameters in the same record are associated with the string to define which service is requested as well as parameters associated with the requested service. Table 1, discussed below, shows one example of Auth DB entries.

Another embodiment provides that the Auth DBs are synchronized across all entities. Such synchronization is not required for most applications.

As will be described in greater detail with reference to FIG. 2, in one application, data produced by a data producer is sent via an attached gateway to a first, processing node in a multistage pipeline transformation. Each stage of the pipeline (including the first) may be implemented at a server node. Finally, when all stages have processed the data, the resulting transformed data is delivered to one or more data consumers via the consumer's attached gateway(s). The AuthDBs are used to authenticate each processing request making up a stage of this pipeline, including the final deliver stage to the consumer.

In another application, a user 152 makes a request via its user client 150 to a transform node or application running at a server node 112 or 116. To fulfill this request, the server, node may initiate further requests to other nodes and finally deliver the final results back to the user's client for presentation. This sort of embodiment is often seen in web service networks.

Figure 2:
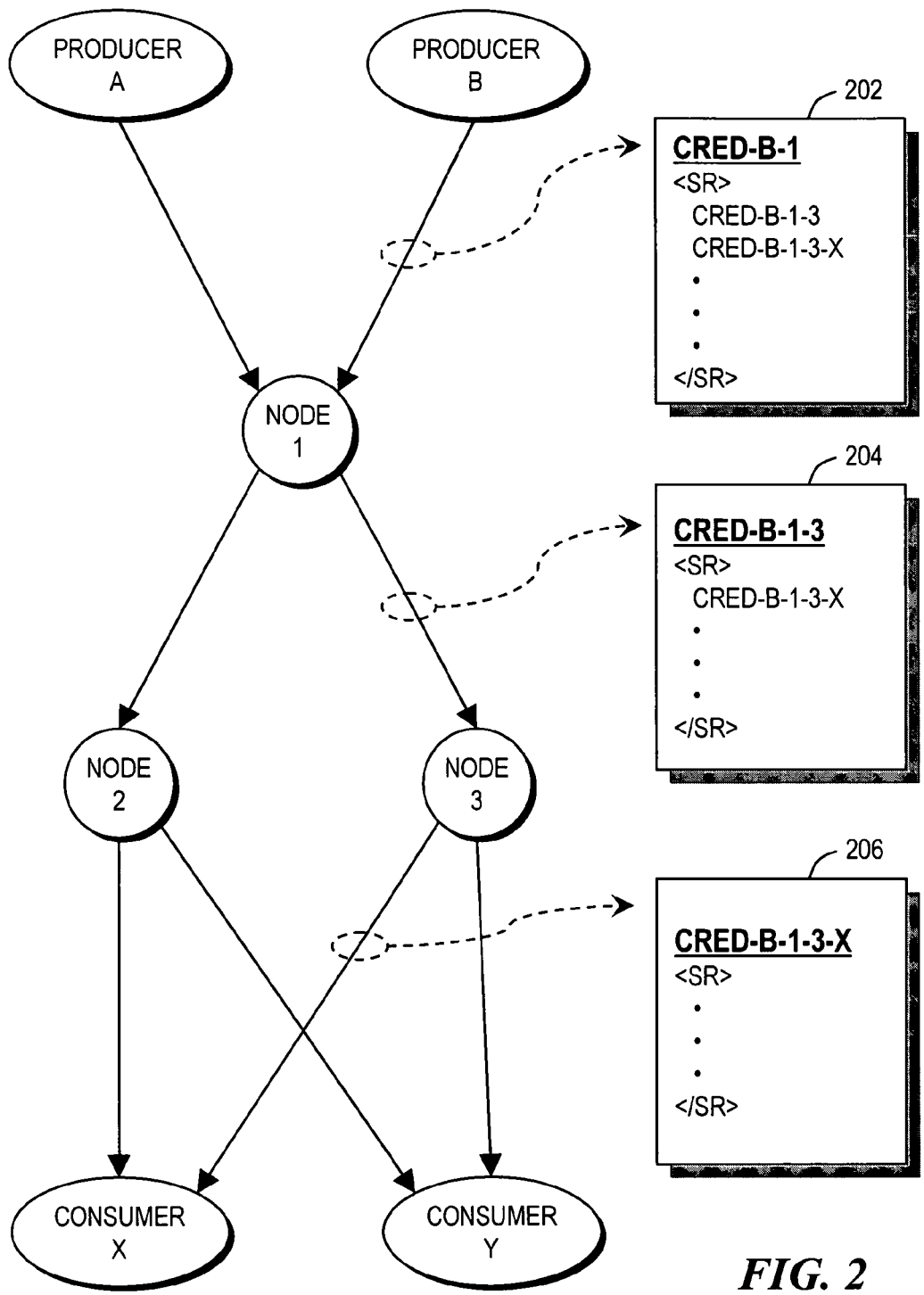
FIG. 2 shows an illustrative example of logical interconnections among data producers A and B, processing nodes 1, 2 and 3, and data consumers X and Y.

FIG. 2 shows an illustrative example of logical interconnections among data producers A and B, processing nodes 1, 2 and 3, and data consumers X and Y. Also shown are examples of credentials within service request messages (SRMs) 202, 204, 206 that are used to access services.

In particular, data producers A and B are shown to be capable of sending messages to node 1. Node 1 is shown to be capable of sending messages to node 2 and to node 3. Each of nodes 2 and 3 is shown to be capable of sending messages to data consumer X and to data consumer Y. By way of non-limiting example, a sequence of service request messages (SRMs) making up one possible transformation pipeline is illustrated along a path leading from data provider B through node 1 and node 3 to data consumer X. For purposes of this simplified logical diagram, the gateway for consumer X and Consumer X itself are both to be construed as part of the node marked "Consumer X".

Service request message (SRM) 202 is sent from data producer B to node 1. SRM 202 includes a first credential, denoted CRED-B-1, which is used to authenticate SRM 202 for processing at Node 1. SRM 202 also contains within itself two other credentials: CRED-B-1-3 and CRED-B-1-3-X. First, CRED-B-1-3 is used by Node 1 as authentication credential for SRM 204 to receive service at Node 3. Next, CRED-B-1-3-X is used by Node 3 as authentication credential for SRM 206 to be processed at Consumer X.

Service request message (SRM) 204 is sent from node 1 to node 3. SRM 204 includes CRED-B-1-3-X, which is copied from the second credential in SRM 202. CRED-B-1-3 is the authentication credential for processing SRM 204 at Node 3.

Service request message (SRM) 206 is sent from node 3 to data consumer X. Since SRM 206 is used in the final link in the series of elements, it contains no embedded credentials. Only CRED-B-1-3-X is used as authentication credential for service at Consumer X.

Table 1 shows an embodiment of an authorization database (AuthDB). Of course, Table 1 is one example; many variants are possible within the scope of the invention.

TABLE 1

Example of Authorization Database (Auth DB)

| Credential (Key) | Parameter | Parameter Value |
|---|---|---|
| xy . . . z | SERVICE-NAME-PATTERN: | UPDATE-INVENTORY |
|  | OPEN-UNTIL: | 1200 10/01/2005 |
|  | OPEN-COUNT: | 5 |
|  | OPEN-BUDGET: | $25.00 |
|  | CAN-DELEGATE? | YES |
|  | DELEGATED-BY: | NULL |
| ab . . . c | SERVICE-NAME-PATTERN: | UPDATE-INVENTORY |
|  | OPEN-UNTIL: | 1300 01/02/2006 |
|  | OPEN-COUNT: | 0 |
|  | OPEN-BUDGET: | $0 |
|  | CAN-DELEGATE? | NO |
|  | DELEGATED-BY: | xy . . . z |
| 12 . . . 9 | SERVICE-NAME-PATTERN: | RETRIEVE-INVENTORY |
|  | OPEN-UNTIL: | 1600 03/02/2006 |
|  | OPEN-COUNT: | 99 |
|  | OPEN-BUDGET: | $0 |
|  | CAN-DELEGATE? | NO |
|  | DELEGATED-BY: | NULL |
| . | . | . |
| . | . | . |
| . | . | . |

In this illustrative example, an Auth DB record includes a credential and a set of fields defined by parameters and parameter values.

A credential is a string that, in one embodiment, is sixteen bytes (128 bits) long. Generally, the credential is an unguessable string, and may be used as a primary key in the Authorization Database.

SERVICE-NAME-PATTERN specifies the service associated with that credential. Generally, the service denotes an application or other function that is performed in response to a service request message (SRM). In some embodiments, this may be a service description pattern, schema, or wild card expression; such indicates the set of services that may be accessed by SRMs using the credential.

OPEN-UNTIL specifies the expiration time of this credential.

OPEN-COUNT specifies how many times (maximum) the credential may be used to authorize a service request. Generally, OPEN-COUNT is decremented each time a service performed.

OPEN-BUDGET specifies how much money (maximum) may be spent in servicing the request. OPEN-BUDGET may be decremented when a service is performed.

CAN-DELEGATE? specifies whether or not this credential may be used to delegate authorization to another credential.

DELEGATED-BY identifies which other credential was used in authorizing this delegated credential. In the second record of this example, the credential was delegated by xy . . . z, which is the key in the first record.

Table 2 shows a "credentialed" service request message (SRM). A credentialed SRM is an SRM in which a credential string (for example, 128 bits) is present.

TABLE 2

Example of Credentialed Service Request Message (SRM)

| Credential@ServerID: | xy . . . z@SERVER_A |
|---|---|
| Service Request Information (I): | <INVENTORY-UPDATE> |
| | < PRODUCT "WIDGET" /> |
| | < AMOUNT –2 /> |
| | < TIME 1406 10/01/2005 /> |
| | < STORE 336 /> |
| | . |
| | . |
| | . |
| | </INVENTORY-UPDATE> |

The credentialed SRM is shown to include the credential string associated with a server identifier, followed by a set of specifications that may be expressed in a language such as Extensible Markup Language (XML) or a variant thereof. In this example:

The "credential" xy . . . z is a string that is sixteen bytes (128 bits) long.

SERVER_A identifies the server that runs the application carrying out the service being requested The service request message (SRM) is an Inventory Update SRM that instructs SERVER_A to update an inventory in a database. In particular, the entity sending the SRM requests that SERVER_A decrement the number of widgets in store 336's inventory by two widgets, noting the time and date of the inventory update request.

In contrast to the credentialed SRM of Table 2, an example of uncredentialed SRM is shown in Table 3.

TABLE 3

Example of UNcredentialed Service Request Message

| Service Request Information (I): | <INVENTORY-UPDATE> |
|---|---|
| | < PRODUCT "WIDGET" /> |
| | < AMOUNT –2 /> |
| | < TIME 1406 10/01/2005 /> |
| | < STORE 336 /> |
| | . |
| | . |
| | . |
| | </INVENTORY-UPDATE> |

In this example, the credential is presented outside of the SRM, for example earlier in a protocol execution in which the service request is communicated. In this scenario, there is no need to include the credential inside the SRM itself. Of course, the credential may be included in the SRM for redundancy.

SRM processing methods. The following discussion refers to a Service Requester R and a Server A. These entities are intended to be broad designations and not be tied to specific elements. The entities in FIGS. 1 and 2 such as data producers, servers, nodes, and data consumers may each take on one or the other role of either Service Requester R or Server A at one time or another, depending on the situation. For example, in a scenario in which a request is passed serially along plural entities, the second entity may serve as a Server to the first entity, but is a Service Requester to the third entity. Generally, a Server A may be any entity that has an Authorization Database (Auth DB) associated with it, either inherently, directly, or indirectly such as through a gateway. Often, a data producer 102, 106 is a Service Requester R and a server 112, 116 or data consumer gateway 130, 140 constitute Servers A.

Figure 3A:
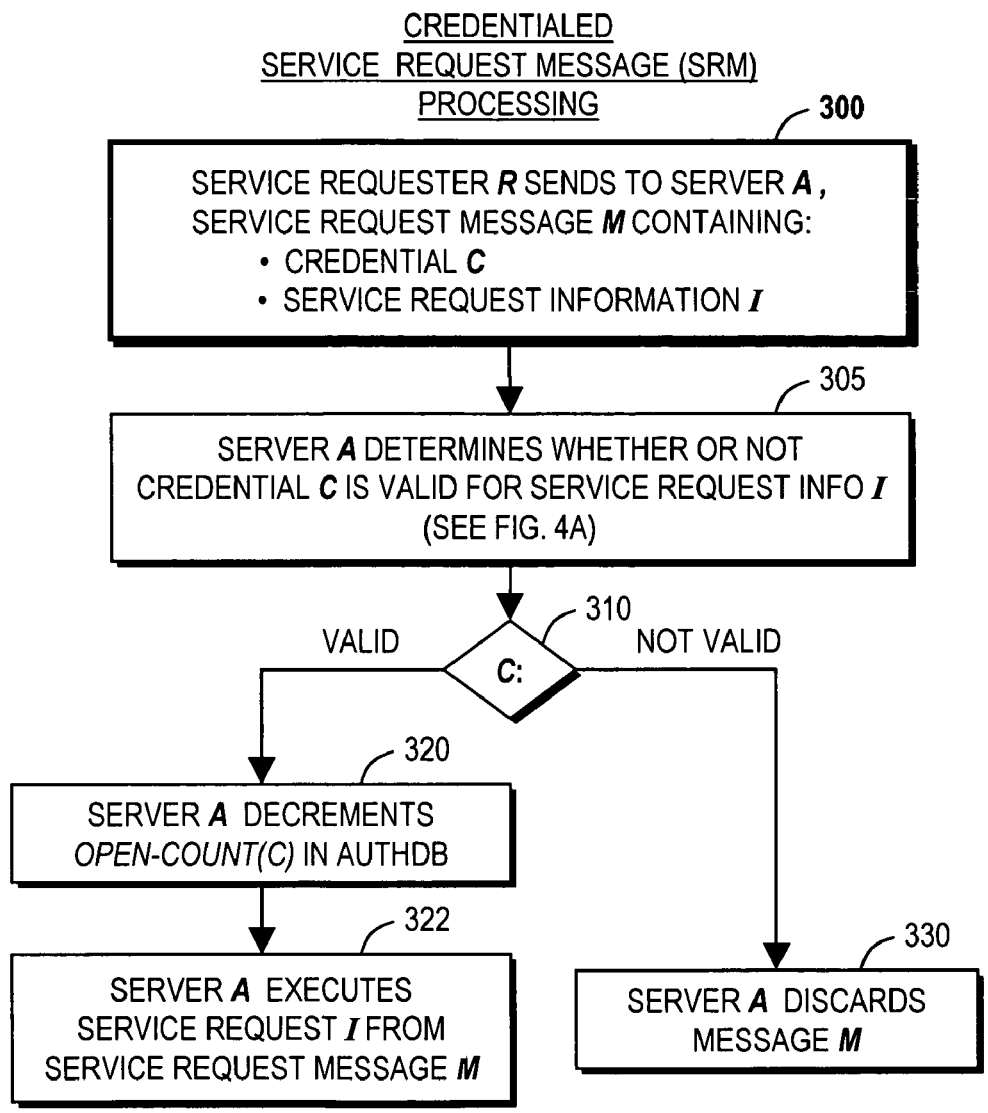
FIG. 3A is a flowchart showing how a service request is processed using a credentialed service request message (SRM)

FIG. 3A is a flowchart showing how a service request is processed using a credentialed SRM.

Block 300 indicates a Service Requester R sending to Server A, a service request message M. The SRM is understood to include a credential C and service request information I. The SRM may be modeled after Table 2.

After the SRM is sent to Server A, block 305 indicates that Server A checks the validity of the credential in the SRM. The I fields can be checked in the SRM validity check 305. One embodiment of a credential validity check is described below, with reference to FIG. 4A.

Block 310 indicates Server A's decision on the validity of credential C. If Server A determines that the credential is valid, then control passes to block 320. However, if Server A determines that the credential C is not valid (as would be the case in a denial of service attack), then control passes to block 330 (discussed below).

Block 320 indicates that Server A decrements the value of the open_count parameter for credential C in its authorization database (Auth DB). This reduces by 1, the number of times that credential C may be used to request a service at that server. Step 320 is only needed in embodiments in which the open-count field and mechanism are being used. Embodiments that do not use this mechanism have no need for this decrementing step.

Block 322 indicates that Server A executes the service (application) requested of it (such as inventory updating), thus completing processing of the credentialed SRM. In addition to the processing of SRM information I that is performed by block 305, the invention provides that block 322 may also process SRM information I.

Block 330 indicates that Server A merely discards the SRM having the invalid credential (block 310). Optionally, Server A may send a message back to the service requester to indicate that the SRM has been discarded, if such an acknowledgement mechanism is provided.

Figure 3B:
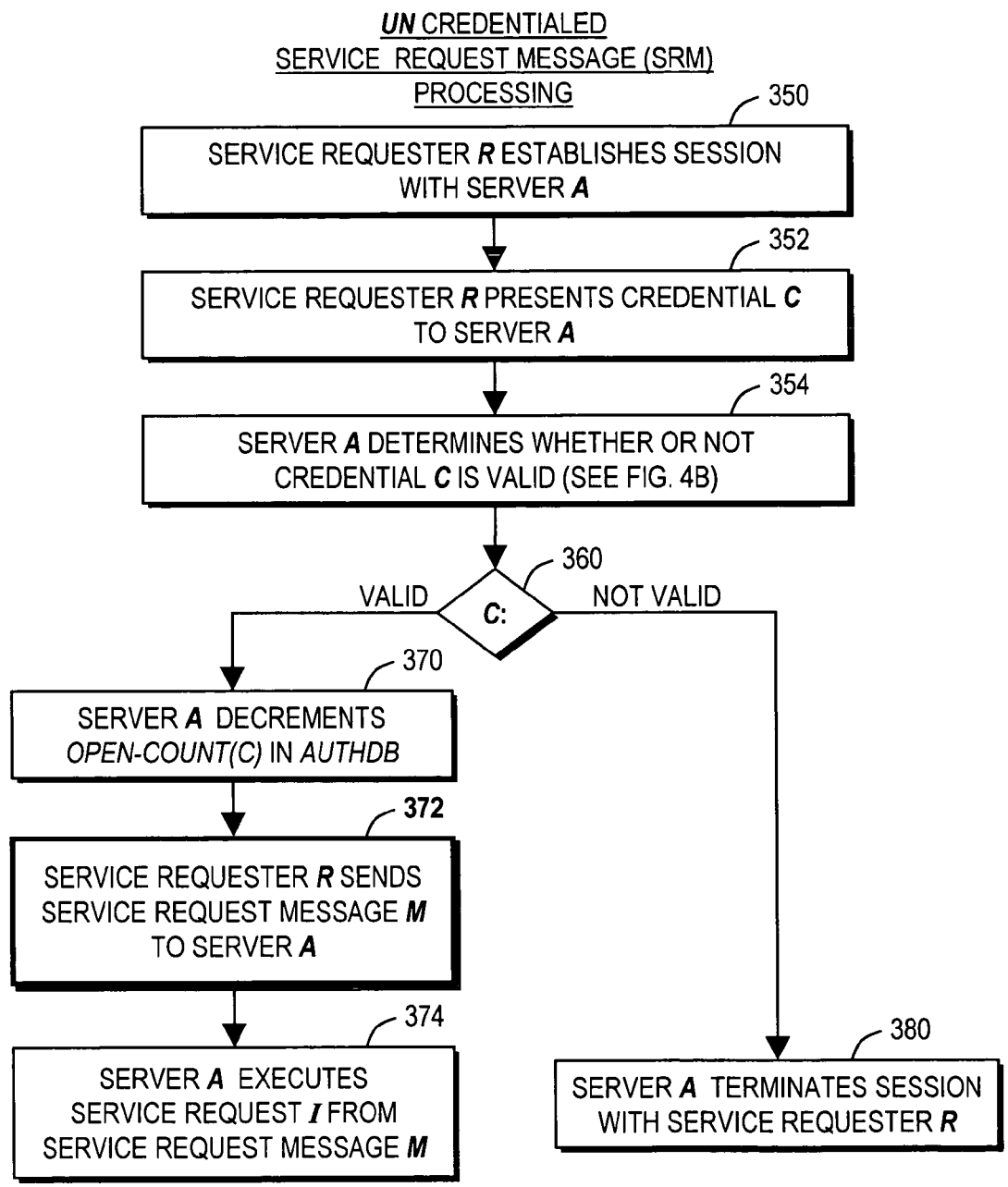
FIG. 3B is a flowchart showing a method of processing a service request when a credential is validated before an uncredentialed SRM is allowed to be transmitted.

FIG. 3B is a flowchart showing a method of processing a service request when a credential is validated before the SRM is allowed to be transmitted. Accordingly, FIG. 3B shows a use of uncredentialed SRMs such as that represented in Table 3.

Block 350 indicates that a Service Requester R establishes a session with Server A. As known in the art, a session is a temporally extended interaction between two or more parties. A session may be established using any suitable protocol, such as that provided in TCP (transmission control protocol), for example.

Block 352 indicates that Service Requester R presents a credential C to Server A outside a service request message (SRM).

Block 354 indicates that Server A determines whether or not credential C is valid. The I fields cannot be checked in block 354 since the SRM has not yet been sent.

Block 360 indicates Server A's decision on the validity of credential C. If Server A determines that the credential is valid, then control passes to block 370. However, if Server A determines that the credential is not valid, then control passes to block 380 (described below)

Block 370 indicates that Server A decrements the value of the open_count parameter for credential C in its authorization database (Auth DB). This reduces by 1, the number of times that credential C may be used to request a service at that server. As with FIG. 3A, this step is not executed in embodiments not supporting open-count field and mechanism. Control then passes to block 372.

Block 372 indicates that the Service Requester R sends the service request message (SRM) to Server A. Significantly, in FIG. 3B as distinguished from FIG. 3A, the SRM is sent only after the validity of credential C has been verified (block 360).

Block 374 indicates that Server A executes the service (application) requested of it (such as inventory updating), thus completing processing of the uncredentialed SRM. At this time, SRM information I may be fully processed, since validation step 354 is performed as a precondition to SRM arrival in block 372.

If in block 360 Server A determined that the credential C is not valid (as would be the case in a denial of service attack), then control passes to block 380. Block 380 indicates that Server A terminates the session with Service Requester R. Because, in the event of an invalid credential, a service request message (SRM) is never sent, it is not necessary to consider affirmatively notifying Service Requester R that any message was dropped. Instead, Server A's termination of the session informs Service Requester R that there is some problem. In the scenario shown in FIG. 3B, if the credential is invalid, the session can be aborted before the server even accepts the SRM, not only saving time and disk space, but also thwarting denial of service attacks.

Figure 4A:
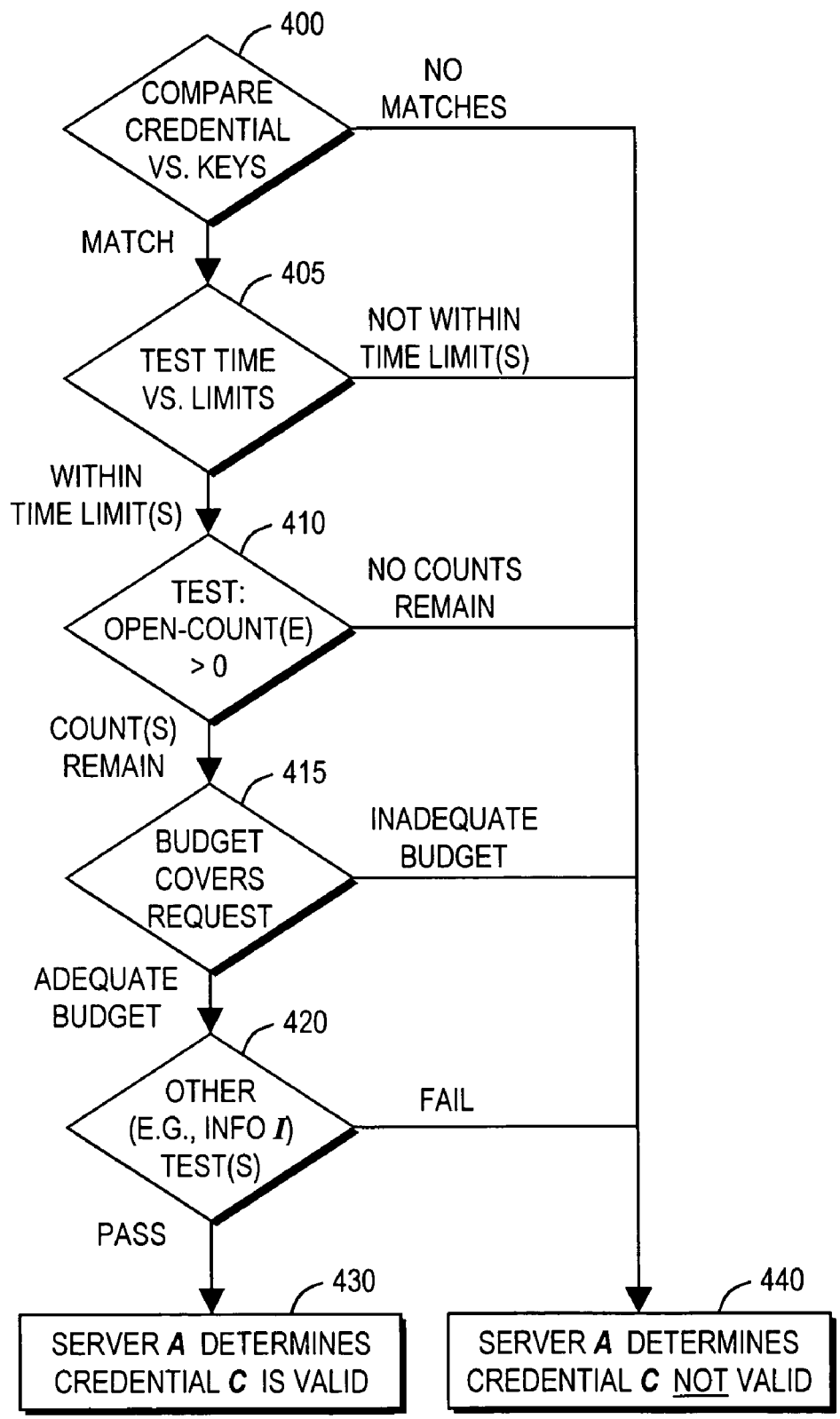
FIG. 4A is a flowchart showing an embodiment of an SRM validity check in which message information I is present.

FIG. 4A is a flowchart showing one embodiment of an SRM validity check. FIG. 4A is included in one embodiment of FIG. 3A's block 305. The SRM validity check may be considered to be a set of tests that are carried out against the credential, and against other parameters in the service request message (SRM). The tests may be carried out sequentially (as illustrated) or in parallel. If any test fails, then Server A (or other entity carrying out the credential validity check) determines (block 440) that the SRM is not valid. If all tests are satisfied, then Server A (or other entity carrying out the credential validity check) determines (block 430) that the credential is valid.

By way of example, the tests in FIG. 4A include:

Block 400 indicates a search of the authorization database (Auth DB) to see if there is a record E having a key that matches the credential C in the SRM under consideration. If a match is found, then additional tests can be carried out. However, if no match is found for C, then control passes to block 440 (credential deemed not valid).

Block 405 indicates a test to see whether the time stamp of the arriving SRM (or, alternatively, current time) falls within acceptable time limits. Essentially, this test determines if the SRM's credential has expired (or is somehow received before activation). If the time is within acceptable time limits, then additional tests can be carried out. However, if the time exceeds acceptable limits, then control passes to block 440 (credential deemed not valid).

Block 410 indicates a test of the open-count parameter value for the record E having the matching key (from block 400). An open-count(E) value greater than zero indicates that the number of times this credential has been used to request service is still less than the maximum number of times authorized; in this event, additional tests can be carried out. However, an open-count (E) value that has already been decremented to zero indicates that the credential has already requested all the service requests that it has been authorized to request; in this event, control passes to block 440 (credential deemed not valid).

Block 415 indicates a test of the value of the open-budget parameter value for the recording having the matching key (from block 410). Essentially, this test determines whether enough funds remain to carry out the requested service. If open-budget(E) meets or exceeds the cost of the requested service, then additional tests can be carried out. However, if open-budget(E) is less than the cost of the requested service, then control passes to block 440 (credential deemed not valid).

Block 420 generally indicates one or more tests, not specifically enumerated above, that may be performed. In particular, block 420 indicates tests that may involve information I that has been included in the received SRM. One of the 'other tests' may be to check whether or not the service name in information I matches the service description pattern in the SERVICE-NAME-PATTERN field of the database entry. Of course, as one skilled in the art can appreciate, more complicated checks of allowed parameter values can be implemented here as well, given that SRM information I is available. If the tests are passed, then control passes to block 430 (credential deemed valid). If any test is failed, then control passes to block 440 (credential deemed not valid).

Practical embodiments may omit some of these tests, include additional tests, and/or include different tests.

In particular, the tests that are carried out for credentialed SRMs are generally different from the tests carried out for uncredentialed SRMs. With credentialed SRMs, service request information I has already arrived at block 300 before the credential validity check 305. However, with uncredentialed SRMs, service request information I is generally sent at block 372 after the time of the external-credential check 354.

By implication, credential validity determination 305 (FIG. 3A) and credential validity determination 354 (FIG. 3B) generally differ. That is, the FIG. 3B validity determination 354 cannot be made based on the contents of an SRM because no SRM has yet been sent. Since an SRM has not been sent at the time of the credential validity determination, less information is generally present to use in judging credential validity, so credential criteria are generally less expressive. Accordingly, since no SRM has been sent, unless Service Requester R sends information equivalent to the parameter values in an SRM, such values are not present at the time of credential checking. For example, uncredentialed SRM processing cannot perform checks based on size, types, or other content properties of the I information.

Figure 4B:
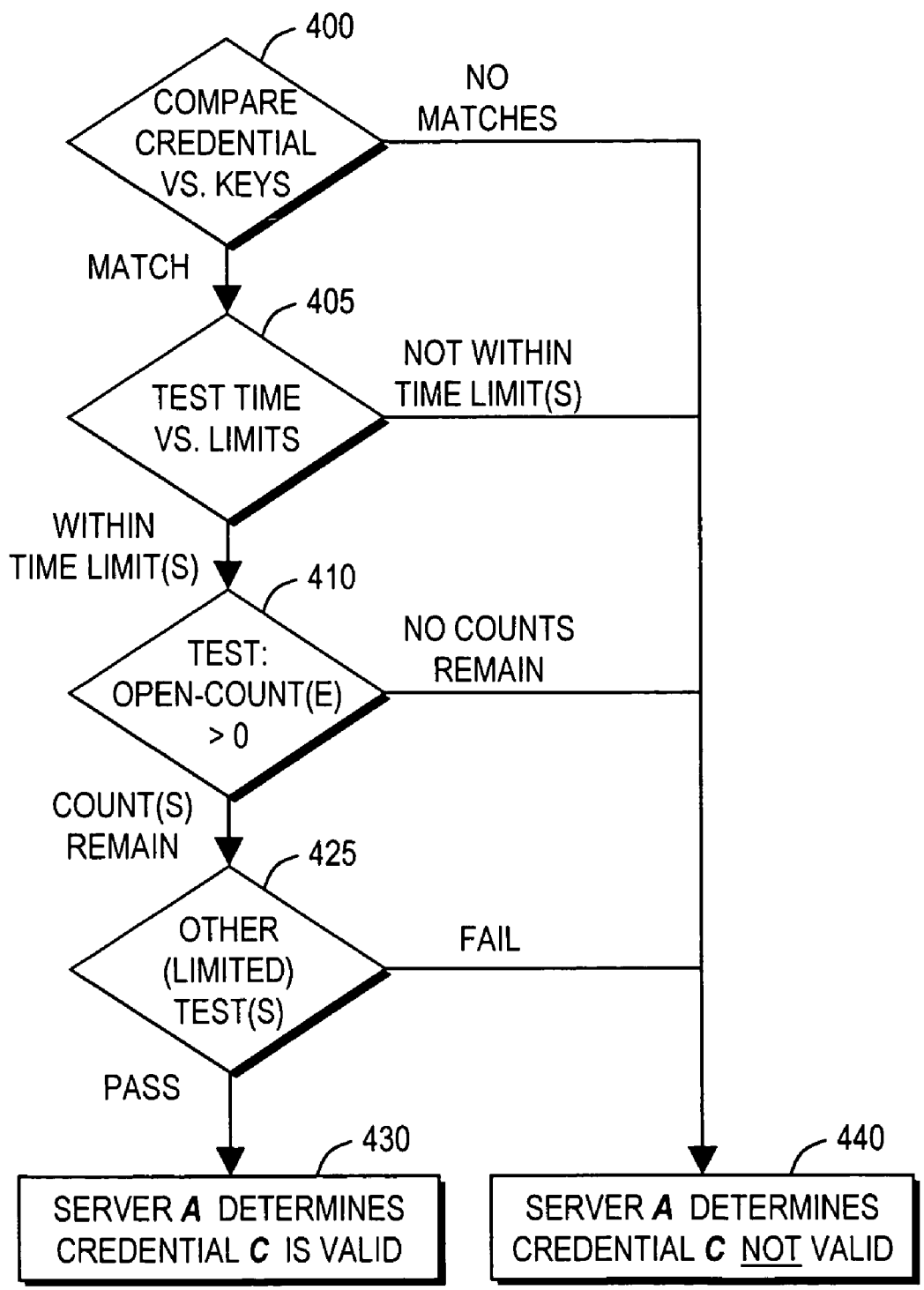
FIG. 4B is a flowchart showing an embodiment of a credential validity check in which message information I is not present at the time of the validity check.

To illustrate one possible difference between blocks 305 (FIG. 3A) and 354 (FIG. 3B), the flowchart of FIG. 4B shows an embodiment of a credential validity check in which message information I is not present since no SRM has yet been sent. FIG. 4B may be used to implement block 354 (FIG. 3B). Elements in FIG. 4B that have numerals corresponding to those in FIG. 4A generally perform corresponding functions. However, an exception is that FIG. 3B block 354 does not check parameters in the information I of any SRM because the SRM is not sent until block 374. Thus, any of the FIG. 4B "other test(s)" 425 cannot generally involve the breadth of testing that is provided by FIG. 4A test(s) 420.

Delegation. The invention provides for delegation of authority to obtain service. Generally speaking, delegation involves one actor providing a second actor with a credential sufficient to allow the second actor to obtain service necessary to process some task on behalf of the first actor. A useful advantage of delegating authority in this way is that it allows task processing to be distributed among many nodes, gaining the speed advantages of parallel processing. Delegating authority can also reduce or disperse network traffic, in that the first actor need not be directly involved in making each request itself.

In one embodiment, delegation of authority can be achieved as a normal part of the SRM processing scheme described herein. That is, authority may be delegated using a particular example of an SRM message, rather than relying on a dedicated delegation scheme external to SRMs.

Table 4 shows the information (I) portion of a service request message (SRM) that constitutes a DELEGATION-REQUEST message.

TABLE 4

Example of Delegation Request
("Service Request Information I" of Service Request Message)

<DELEGATION REQUEST>
  < NEW-CREDENTIAL C1 />
  < OPEN-UNTIL TIME1 />
  < OPEN-COUNT COUNT1 />
  .
  .
  .
  < CAN-DELEGATE? YES-NO />
</ DELEGATION REQUEST >

This example of a Delegation Request SRM includes a new credential string C1 and the field values for initializing its AuthDB entry. In this example, the field values are OPEN-UNTIL, OPEN-COUNT, CAN-DELEGATE, and so forth. Like other messages, a Delegation Request message can be expressed in XML or equivalent format.

A Delegation Request can be submitted via either credentialed or (as shown in Table 4) an uncredentialed message. In one embodiment, a requester selects a random string as a new credential C1. Random strings that are long enough make the probability of collision with all other credentials selected in this way insignificant. Advantageously, this technique avoids the need for the server to send a reply message back to the requester.

In a first alternative embodiment, the Server examines the credential string C1 to ensure that there is no "collision" (conflict) with existing credentials, and sends the Service Requester an acknowledgement (or negative acknowledgement) of the Service Requester's chosen credential string.

In a second alternative embodiment, the Service Requester sends a message to Server A. Server A then chooses a suitable credential string C1, rather than letting the Service Requester choose a credential string. An advantage of this second alternative embodiment is that the Server can preliminarily examine its Auth DB's list of existing credential strings (keys) and choose a new credential string that is unique.

These first and second alternative embodiments avoid the possibility, however small, of collisions (conflicts) that might be encountered were plural Service Requesters to separately choose respective random credential strings that happened to be identical.

Figure 5A:
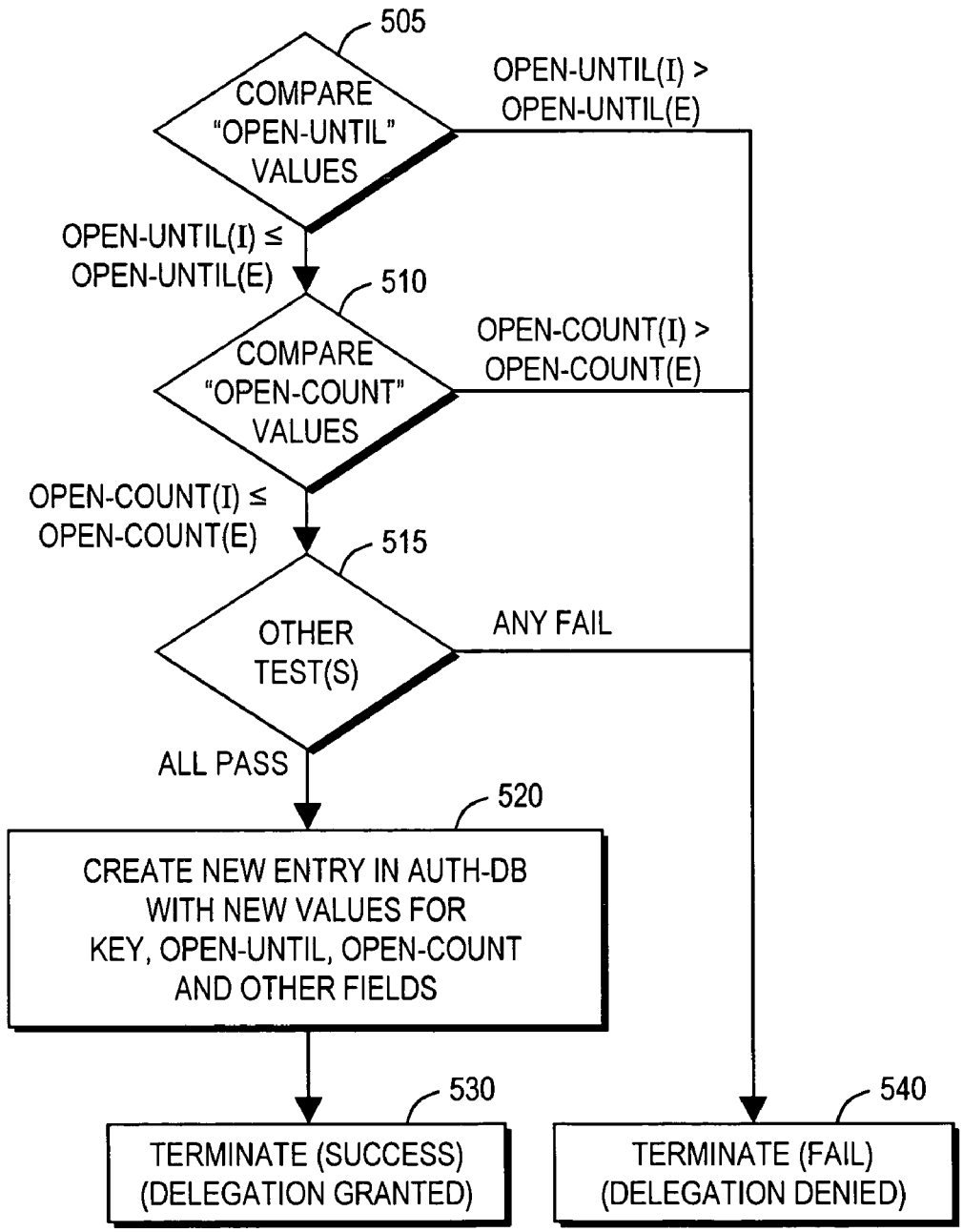
FIGS. 5A and 5B are flowcharts showing embodiments of methods for processing a Delegation Request SRM.

FIG. 5A is a flowchart showing one embodiment of a method for processing a Delegation Request SRM. In the delegation request, a new credential with its own set of proposed attributes in information I are received. Information I may be exemplified by that in Table 4. C is the credential that is checked in FIG. 3A or FIG. 3B. E is an entry of the Authorization Database corresponding to the credential C that has presumably been judged valid in FIG. 3A or FIG. 3B.

One embodiment checks whether or not the new credential's proposed attributes are no more powerful (less constraining) than those of the parent credential already in Authorization Database entry E. If these checks pass, a new record is created in the AuthDB associated with the server that is to process requests authenticated by the delegated credential.

Preliminarily, to reach FIG. 5A, the delegation request SRM must already have been accepted for processing with credential processing as described with reference to FIG. 3A or 3B, for example.

Block 505 indicates a determination of whether or not the value of open-until in the incoming delegation request message I is no later than the value of open-until in the database entry E that included a key match in block 500. If open-until (I) is less than or equal to open-until(E), then the delegation request message's time is within acceptable limits and further testing can take place. However, if open-until(I) is greater than open-until(E), then a time violation is indicated and execution terminates at block 540 (delegation failed).

Block 510 indicates a determination of whether or not the value of open-count in the incoming delegation request message I is less than or equal to the value of open-count in the database entry that included a key match in block 500. If open-count(I) is less than or equal to open-count(E), then the delegation request message has not exceeded its number of authorized executions and other tests may be performed. However, if open-count(I) exceeds open-count(E), then the delegation request message has exceeded its number of authorized executions and execution terminates at block 540 (delegation failed).

Block 515 generally indicates any other tests, which may be optional, that are also performed. Any test failure causes termination without creating a new entry in the authorization database of the server carrying out the processing. However, if all tests are passed, then control passes to block 520.

Block 520 indicates the creation of a new record in the authorization database of the server carrying out the processing. The new record has a key value equal to the credential in the delegation request message, which in the case of Table 4 is C1. The values of the parameters in the new record are assigned in accordance with the values of corresponding parameters specified in the delegation request message. For example, open-count(new) is set equal to open-count(I); open-until(new) is set equal to open-until(I); and so forth. Thereafter, block 530 indicates termination of the process with a successful record creation in the Auth DB.

Figure 5B:
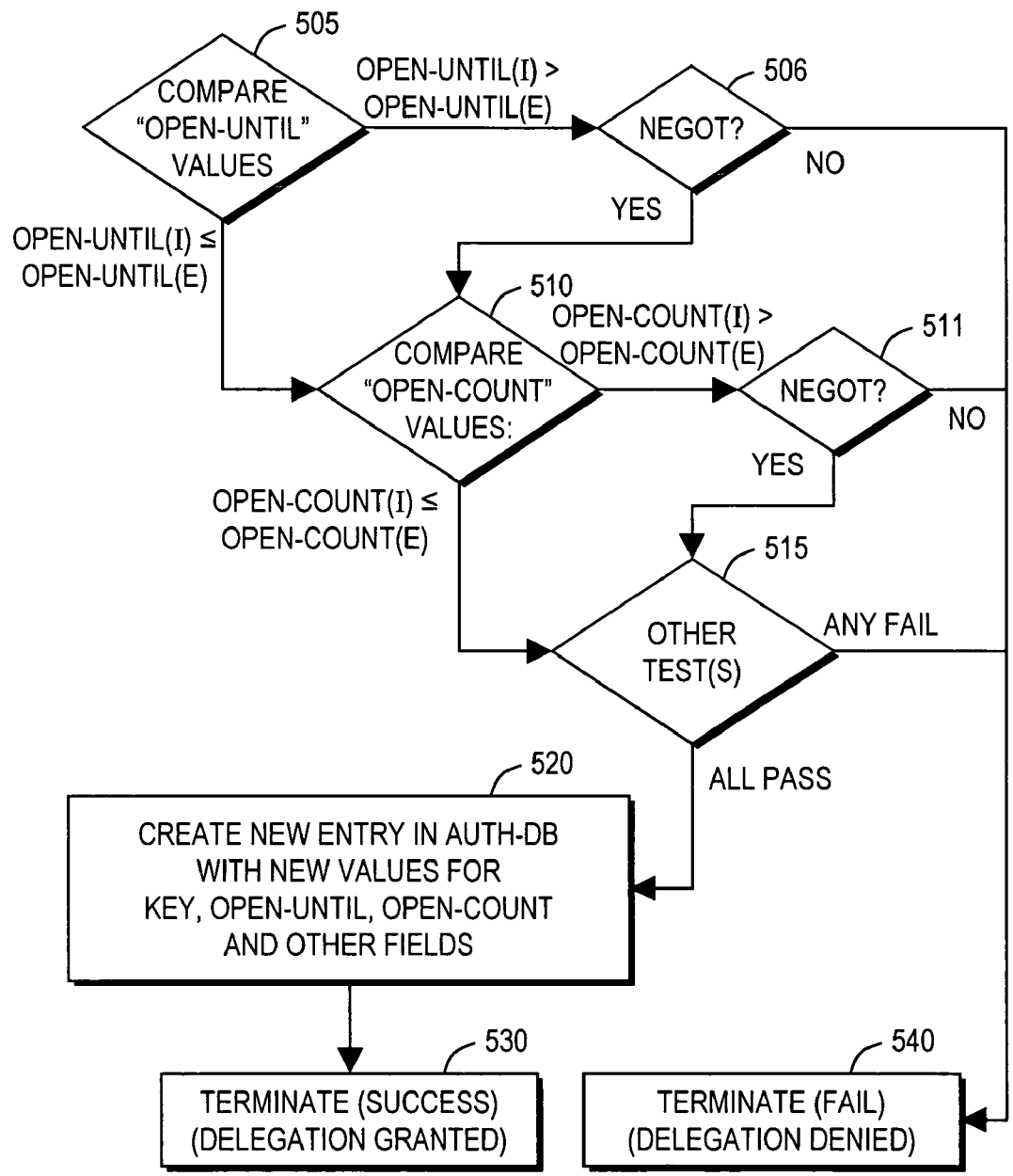

FIG. 5B illustrates the alternative embodiment to FIG. 5A. In FIG. 5B, the requirements for achieving a successful termination are relaxed by providing for a limited delegation. For example, if open-until(I)>open-until(E) as determined by block 505, the value of open-until(new) is set equal to the more restrictive value, open-until(E), rather than to the less restrictive value open-until(I). Likewise, if open-count(I)> open-count(E) as determined by block 510, the value of open-count(new) is set equal to the more restrictive value, open-count(E), rather than to the less restrictive value open-count (I).

FIG. 5B illustrates the alternative embodiment of delegation request processing. FIG. 5B differs from FIG. 5A in the insertion of decision blocks 506, 511 that allow testing to continue if particular parameters are negotiable. Here, "negotiable" means "not absolute" in the sense that a requirement may be relaxed under certain circumstances, in which a delegation is granted, albeit with more restrictive parameters than those requested. Negotiability may be defined in the SRM, by the application provider, or both. Joint negotiability occurs when some fields are defined to be negotiable by application provider and some fields are allowed to be requested as negotiable by the service requester.

For example, if open-until is negotiable (not absolute), then control passes from decision block 506 to subsequent test 510 despite the fact that open-until(I)>open-until(E). Likewise, if open-count is negotiable, then control passes from decision block 511 to subsequent tests 515 despite the fact that open-count (I)>open-count(E). If either parameter is non-negotiable, then control passes to block 540 (delegation denied) in the same manner as in FIG. 5A. Some tests 515 may be absolute (not negotiable), in which case a testing violation causes a delegation request to be denied altogether per block 540. The alternative embodiment in FIG. 5B favors successful termination (through blocks 520, 530) in which a delegation is granted, albeit with more restrictive parameters than those requested. For example, it is typical that at the time of the delegation, it may not be known to the delegator exactly how many times his key has been used at a remote service node to grant the requests seen over time at that node. Thus, it is advantageous that the delegator can request a large open-count for the delegated key, yet with the understanding that the actual open-count granted for the delegated key will be no larger than the current value known at the server.

The processing involved in carrying out methods described herein may be performed by a suitable general purpose computer or processor arrangement.

In one embodiment, the apparatus is a computer or a cluster of computers, powered by software to execute the functionality described herein. The functional elements described above may be embodied by any suitable systems for performing the described methods, the systems including at least one data processing element. Generally, these data processing elements may be implemented as any appropriate computer(s) employing technology known by those skilled in the art to be appropriate to the functions performed. The computer(s) may be implemented using a conventional general purpose computer programmed according to the foregoing teachings, as will be apparent to those skilled in the computer art. Appropriate software can readily be prepared by programmers based on the teachings of the present disclosure. Suitable programming languages operating with available operating systems may be chosen.

General purpose computers may implement the foregoing methods, in which the computer housing may house a CPU (central processing unit), memory such as DRAM (dynamic random access memory), ROM (read only memory), EPROM (erasable programmable read only memory), EEPROM (electrically erasable programmable read only memory), SRAM (static random access memory), SDRAM (synchronous dynamic random access memory), and Flash RAM (random access memory), and other special purpose logic devices such as ASICs (application specific integrated circuits) or configurable logic devices such GAL (generic array logic) and reprogrammable FPGAs (field programmable gate arrays).

Each computer may also include plural input devices (for example, keyboard, microphone, and mouse), and a display controller for controlling a monitor. Additionally, the computer may include a floppy disk drive; other removable media devices (for example, compact disc, tape, and removable magneto optical media); and a hard disk or other fixed high-density media drives, connected using an appropriate device bus such as a SCSI (small computer system interface) bus, an Enhanced IDE (integrated drive electronics) bus, or an Ultra DMA (direct memory access) bus. The computer may also include a compact disc reader, a compact disc reader/writer unit, or a compact disc jukebox, which may be connected to the same device bus or to another device bus.

The invention envisions at least one computer readable medium. Examples of computer readable media include compact discs, hard disks, floppy disks, tape, magneto optical disks, PROMs (for example, EPROM, EEPROM, Flash EPROM), DRAM, SRAM, SDRAM. Stored on any one or on a combination of computer readable media is software for controlling both the hardware of the computer and for enabling the computer to interact with other elements, to perform the functions described above. Such software may include, but is not limited to, user applications, device drivers, operating systems, development tools, and so forth. Such computer readable media further include a computer program product including computer executable code or computer executable instructions that, when executed, causes a computer to perform the methods disclosed above. The computer code may be any interpreted or executable code, including but not limited to scripts, interpreters, dynamic link libraries, Java classes, complete executable programs, and the like.

From the foregoing, it will be apparent to those skilled in the art that a variety of methods, systems, computer programs on recording media, and the like, are provided.

The present disclosure supports (FIG. 3A—credentialed SRM) a method by which a server can process a service request message (SRM) originating from a service requester. The method involves (a) receiving (300) the SRM, the SRM including a credential string and information (I) specifying a requested service. The method further involves determining (305) whether or not the received credential string is valid, by comparing the received credential string and a key in an authorization database (FIG. 1 Auth DB; Table 1) that is associated with the server and that includes a set of records. The records may include the key, and a set of zero or more parameters constituting respective restrictions on performing the requested service for the service requester associated with the credential string that matches the key. The method further involves testing (305, and FIG. 4A) any parameter values against the restrictions to judge whether or not the restrictions are met, and causing (322) performance of the requested service if the credential string is determined to be valid and the restrictions are judged to be met.

The present disclosure further supports (FIG. 3B—uncredentialed SRM) a method by which a server can process a service request message (SRM) originating from a service requester. The method involves receiving (352) a credential string, and determining (354) whether or not the received credential string is valid, by comparing the received credential string and an authorization database string from an authorization database (FIG. 1 Auth DB; Table 1) that is associated with the server and that includes a set of records including respective authorization database strings. If the received credential string is determined to be valid, the method further involves receiving (372) the SRM that includes information (I) specifying a requested service, and causing (374) performance of the requested service.

The authorization database string may be a key for a record in the authorization database.

The method may further involve receiving the SRM from the service requester through a secure application network.

The secure application network may be one in a group of networks consisting essentially of a virtual private network (VPN), an IPsec-based VPN overlay on top of an IP network, a secure intranet within a firewall, a web service network, and a distributed XML transformation system (DXTS).

The parameters in the authorization database may include a service name parameter defining at least one service allowed to be performed, and the parameter values testing step may involve checking whether or not the requested service specified in the received SRM matches the service name parameter in the authorization database.

The SRM's information (I) specifying the requested service, may be expressed in Extensible Markup Language (XML).

The set of parameters may include at least one from a set of parameters consisting of an OPEN-UNTIL parameter the specifies when the credential string's authorization expires; an OPEN-COUNT parameter that specifies a number of remaining times that the service requester associated with credential string is authorized to have the requested service performed; an OPEN-BUDGET parameter that specifies a budget remaining for carrying out the requested service for the service requester associated with the credential string; and a CAN-DELEGATE parameter that specifies whether or not the server can delegate authority to perform the requested service for the server on behalf of the service requester associated with the credential string.

If the set of parameters includes the OPEN-COUNT parameter, the method may further involve decrementing a value of the OPEN-COUNT parameter upon each performance of the requested service for the service requester associated with the credential string. If the set of parameters includes the OPEN-BUDGET parameter, the method may further involve reducing a value of the OPEN-BUDGET parameter upon each performance of the requested service for the service requester associated with the credential string.

The SRM receiving step may include receiving a delegation request SRM whose requested service includes a delegation request that constitutes a delegation of authority to obtain a delegated service.

The delegation request SRM may include a new credential (C1).

The delegation request SRM may include information (I) including restrictions on a delegated service that will be allowed to be provided to any requester providing a new credential.

The delegation request SRM's information (I) may include a parameter configured to be used in a test to determine if a future service request including the new credential is valid for that future service request.

The method may further involve denying the delegation request if a parameter included in the delegation request information (I) is not at least as restrictive as a corresponding parameter of the credential that authorized the delegation request.

The delegation request SRM may include both a new credential (C1) and information (I) including restrictions on a service that will be allowed to be provided to any requester providing the new credential.

The present disclosure also supports (both FIGS. 3A, 3B) a server that includes an authorization database (FIG. 1 Auth DB; Table 1) that includes a set of records. The records may include an authorization database string configured to be compared to a received credential string associated with a requested service, and a set of zero or more parameters constituting respective restrictions on performing the requested service for a service requester associated with the credential string that matches the authorization database string. The server may also include means for determining (305 or 354) whether or not the received credential string is valid, by comparing the received credential string to the authorization database string, means for testing (FIG. 4A or 4B) any parameter values against the restrictions, to judge whether or not the restrictions are met, and means for causing (322 or 374) performance of the requested service if the credential string is determined to be valid and the restrictions are judged to be met.

The present disclosure further supports computer program products including computer executable code or computer executable instructions that, when executed, causes at least one computer to perform the described methods.

The present disclosure further supports systems configured to perform the described methods.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the spirit and scope of the present invention. It is therefore to be understood that within the scope of the appended claims and their equivalents, the invention may be practiced otherwise than as specifically described herein.

What is claimed is:

1. A method by which a server can process a service request message originating from a service requester, the method comprising:
   receiving the service request message including:
      [a1)]
         a revocable, delegable credential string; and
      [a2)]
         information specifying a requested service;
   determining whether the credential string is valid, by comparing the credential string and a key in an authorization database that is associated with the server and that includes a set of records including:
      [b1)]
         the key, configured to be compared to the credential string; and
      [b2)]
         a set of parameters constituting respective restrictions on performing the requested service for the service requester associated with the credential string that matches the key;
   testing parameter values against the restrictions to judge whether the restrictions are met; and
   causing performance of the requested service if the credential string is determined to be valid and the restrictions are judged to be met.

2. The method of claim 1, further comprising:
   receiving the service request message from the service requester through a secure application network.

3. The method of claim 2, wherein the secure application network is one in a group of networks consisting essentially of:
   a virtual private network;
   an IPsec-based VPN overlay on top of an IP network;
   a secure intranet within a firewall;
   a web service network; and
   a distributed XML transformation system.

4. The method of claim 1, wherein:
   the parameters in the authorization database include a service name parameter defining at least one service allowed to be performed; and
   the parameter values testing includes checking whether the requested service specified in the service request message matches the service name parameter in the authorization database.

5. The method of claim 1, wherein:
the service request message's information specifying the requested service, is expressed in Extensible Markup Language.

6. The method of claim 1, wherein the set of parameters includes at least one from a set of parameters consisting essentially of:
an OPEN-UNTIL parameter the specifies when the credential string's authorization expires;
an OPEN-COUNT parameter that specifies a number of remaining times that the service requester associated with credential string is authorized to have the requested service performed;
an OPEN-BUDGET parameter that specifies a budget remaining for carrying out the requested service for the service requester associated with the credential string; and
a CAN-DELEGATE parameter that specifies whether the server can delegate authority to perform the requested service for the server on behalf of the service requester associated with the credential string.

7. The method of claim 6, wherein:
if the set of parameters includes the OPEN-COUNT parameter, the method further comprises decrementing a value of the OPEN-COUNT parameter upon each performance of the requested service for the service requester associated with the credential string; and
if the set of parameters includes the OPEN-BUDGET parameter, the method further comprises reducing a value of the OPEN-BUDGET parameter upon each performance of the requested service for the service requester associated with the credential string.

8. The method of claim 1, wherein the service request message receiving includes:
receiving a delegation request service request message whose requested service includes a delegation request that constitutes a delegation of authority to obtain a delegated service.

9. The method of claim 8, wherein the delegation request service request message includes:
a new credential.

10. The method of claim 8, wherein the delegation request service request message includes:
information including restrictions on a delegated service that will be allowed to be provided to a requester providing a new credential.

11. The method of claim 10, wherein the delegation request service request message's information includes:
a parameter configured to be used in a test to determine if a future service request including the new credential is valid for that future service request.

12. The method of claim 10, further comprising:
denying the delegation request if a parameter included in the delegation request information is not at least as restrictive as a corresponding parameter of the credential that authorized the delegation request.

13. The method of claim 8, wherein the delegation request service request message includes:
a) a new credential; and
b) information including restrictions on a service that will be allowed to be provided to a requester providing the new credential.

14. A method by which a server can process a service request message originating from a service requester, the method comprising:
receiving a revocable, delegable credential string;
determining whether the credential string is valid, by comparing the credential string and an authorization database string from an authorization database that is associated with the server and that includes a set of records including respective authorization database strings; and
if the credential string is determined to be valid:
receiving the service request message that includes information specifying a requested service; and
causing performance of the requested service;
wherein the set of parameters includes at least one from a set of parameters consisting essentially of:
an OPEN-UNTIL parameter the specifies when the credential string's authorization expires;
an OPEN-COUNT parameter that specifies a number of remaining times that the service requester associated with credential string is authorized to have the requested service performed;
an OPEN-BUDGET parameter that specifies a budget remaining for carrying out the requested service for the service requester associated with the credential string; and
a CAN-DELEGATE parameter that specifies whether the server can delegate authority to perform the requested service for the server on behalf of the service requester associated with the credential string.

15. The method of claim 14, wherein:
the authorization database string is a key for a record in the authorization database.

16. The method of claim 14, further comprising:
receiving the service request message from the service requester through a secure application network.

17. The method of claim 16, wherein the secure application network is one in a group of networks consisting essentially of:
a virtual private network;
an IPsec-based VPN overlay on top of an IP network;
a secure intranet within a firewall;
a web service network; and
a distributed XML transformation system.

18. The method of claim 14, wherein:
the parameters in the authorization database include a service name parameter defining at least one service allowed to be performed; and
the parameter values testing includes checking whether the requested service specified in the service request message matches the service name parameter in the authorization database.

19. The method of claim 14, wherein:
the service request message's information specifying the requested service, is expressed in Extensible Markup Language.

20. The method of claim 14, wherein:
if the set of parameters includes the OPEN-COUNT parameter, the method further comprises decrementing a value of the OPEN-COUNT parameter upon each performance of the requested service for the service requester associated with the credential string; and
if the set of parameters includes the OPEN-BUDGET parameter, the method further comprises reducing a value of the OPEN-BUDGET parameter upon each performance of the requested service for the service requester associated with the credential string.

21. The method of claim 14, wherein the service request message receiving includes:

receiving a delegation request service request message whose requested service includes a delegation request that constitutes a delegation of authority to obtain a delegated service.

22. The method of claim 21, wherein the delegation request service request message includes:

a new credential.

23. The method of claim 21, wherein the delegation request service request message includes:

information including restrictions on a delegated service that will be allowed to be provided to a requester providing a new credential.

24. The method of claim 23, wherein the delegation request service request message's information includes:

a parameter configured to be used in a test to determine if a future service request including the new credential is valid for that future service request.

25. The method of claim 23, further comprising:

denying the delegation request if a parameter included in the delegation request information is not at least as restrictive as a corresponding parameter of the credential that authorized the delegation request.

26. The method of claim 21, wherein the delegation request service request message includes:

a) a new credential; and
b) information including restrictions on a service that will be allowed to be provided to a requester providing the new credential.

27. A server, comprising:

[a)]
an authorization database that includes a set of records including:
[1)]
an authorization database string configured to be compared to a received revocable, delegable credential string associated with a requested service; and
[2)]
a set of parameters constituting respective restrictions on performing the requested service for a service requester associated with the credential string that matches the authorization database string;
[b)]
means for determining whether the credential string is valid, by comparing the credential string to the authorization database string;
[c)]
means for testing parameter values against the restrictions, to judge whether the restrictions are met; and
[d)]
means for causing performance of the requested service if the credential string is determined to be valid and the restrictions are judged to be met.

* * * * *